(12) United States Patent
DeCristoforo

(10) Patent No.: US 8,140,434 B2
(45) Date of Patent: Mar. 20, 2012

(54) SYSTEM FOR MAKING FUNDS AVAILABLE FOR GAMING

(75) Inventor: Dean A. DeCristoforo, Las Vegas, NV (US)

(73) Assignee: Global Payments, Inc., Atlanta, GA (US)

( * ) Notice: Subject to any disclaimer, the term of this patent is extended or adjusted under 35 U.S.C. 154(b) by 31 days.

(21) Appl. No.: 11/889,724

(22) Filed: Aug. 15, 2007

(65) Prior Publication Data

US 2009/0048973 A1    Feb. 19, 2009

(51) Int. Cl.
*G06Q 40/00* (2006.01)

(52) U.S. Cl. .............. 705/44; 235/380; 705/35; 705/39; 705/45

(58) Field of Classification Search .................. 235/380; 705/35, 39, 44–45
See application file for complete search history.

(56) References Cited

U.S. PATENT DOCUMENTS

| 6,061,792 | A | 5/2000 | Simon |
| 6,081,792 | A | 6/2000 | Cucinotta |
| 6,271,814 | B1 * | 8/2001 | Kaoh .............................. 345/82 |
| 6,843,412 | B1 | 1/2005 | Sanford |
| 2003/0156038 | A1 * | 8/2003 | Hankins et al. .......... 340/815.45 |
| 2003/0211883 | A1 | 11/2003 | Potts |
| 2004/0173673 | A1 | 9/2004 | Potts |
| 2005/0107155 | A1 | 5/2005 | Potts et al. |
| 2005/0107156 | A1 | 5/2005 | Potts et al. |
| 2006/0068897 | A1 | 3/2006 | Sanford et al. |
| 2006/0131395 | A1 * | 6/2006 | Potts et al. .................... 235/380 |
| 2006/0160610 | A1 | 7/2006 | Potts |

FOREIGN PATENT DOCUMENTS

CN    1924940 A    3/2007

OTHER PUBLICATIONS

Global Payments Gaming Services, Inc., "The Current GPGS PlayerCash @dvantage Cash Advance System", Las Vegas, Nevada Sep. 12, 2006.

* cited by examiner

*Primary Examiner* — Melba Bumgarner
*Assistant Examiner* — Jason Pinheiro
(74) *Attorney, Agent, or Firm* — Foley & Lardner LLP

(57) ABSTRACT

A system for making funds available for gaming which includes a terminal which is configured to read customer information from a card. The terminal includes an input/output unit configured to allow the customer to select a quasi-cash transaction and to generate an order authorizing the quasi-cash transaction. The system also includes a station which is configured to retrieve the order and information verifying the identity of the customer and, when the identity of the customer is verified, is configured to, at the customer's option (1) obtain an electronic endorsement from the customer and place the electronic endorsement in an electronic image or (2) print out a hard copy of a check for endorsement by the customer.

10 Claims, 7 Drawing Sheets

By proceeding with this electronic signature device, your cash advance transaction will be processed electronically. A paper check will not be produced for this transaction unless a special request is made.

Do you agree to proceed with an electronic check?

| No | Yes |

FIG.2

*PlayerCash @dvantage*

| Advance Amt | + | Fee | = | Total Charge |
|---|---|---|---|---|
| $ 50.00 | | $ 7.99 | | $ 57.99 |

Endorse Here for Acceptance

X _____

| Previous | Clear | Next |

FIG.4

PlayerCash @dvantage

Greektown Casino
Detroit, MI 48226
MID: 100112673300735   Clerk ID: VIPTEST

Wachovia Bank – National Association   64-975/612

Check No: 80109304

**\*\*$50.00\*\*Dollars**

Fifty dollars and no cents

PAY TO

Name of Cardholder
[Test Cardholder]

Account #
[464875CR8242]   Exp Date [****]   Card Verif # [4648]

Identification Number
[A123456789]

ID State [NV]

ID Exp Date [122009]

Endorse Here for Acceptance
X [signature]

Auth # [123773]

Auth Date/Time [5/22/2007 7:37:32 AM]

Total Charged [$57.99]

Fee: $ 7.99
Accepted
X [T.C.] Initial Here

[signature]
Authorized Signature

SYSTEM FOR MAKING FUNDS AVAILABLE FOR GAMING

BACKGROUND

Gaming establishments, such as casinos, typically provide customers a number of options for obtaining funds for gaming activities. For example, casinos typically provide automated teller machines (ATMs) which allow a customer to directly withdraw cash from one of their accounts or request a cash advance using one of their credit cards by inserting either an ATM card or a credit card and entering their PIN (personal identification number). Such transactions have certain limitations, such as daily withdrawal and/or physical machine limits. For example, a customer may desire more cash than can be accommodated by an ATM or their issuing bank's daily limitations on withdrawals from an ATM. Accordingly, additional options for obtaining funds for gaming have been developed.

Additional options are disclosed in U.S. Pat. No. 6,843,412 (issued Jan. 18, 2005 to Sanford) and U.S. Pat. No. 6,061,792 (issued May 9, 2000 to Simon) and U.S. Patent Application Publications 2003/0211883 (published Nov. 13, 2003 and listing Craig K. Potts); 2006/0160610 (published Jul. 20, 2006 and listing Craig K. Potts); 2006/0068897 (published Mar. 30, 2006 and listing Kirk E. Sanford et al.); 2005/0107156 (published May 19, 2005 and listing Craig Potts et al.); 2005/0107155 (published May 19, 2005 and listing Craig Potts et al.); 2004/0173673 (published Sep. 9, 2004 and listing Craig K. Potts); and 2006/0131395 (published Jun. 22, 2006 and listing Craig K. Potts et al.). The entire contents of these patents and published patent applications are incorporated herein by reference for background information and the devices, systems, processes and techniques disclosed therein.

Although the arrangements disclosed in the documents cited above provide additional flexibility, such arrangements have various disadvantages. For example, some of the arrangements may not comply with applicable policies and/or rules of credit card companies or other organizations involved in governing such transactions. Accordingly, there is still room for improvement in this area.

SUMMARY OF THE INVENTION

The systems and methods described below provide an improved way to obtain funds for gaming activities.

According to one embodiment of the invention, the embodiment provides a system for making funds available for gaming which includes a terminal which is configured to read customer information from a card. The terminal includes an input/output unit configured to allow the customer to select a quasi-cash transaction and to generate an order authorizing the quasi-cash transaction. The system also includes a station which is configured to retrieve the order and information verifying the identity of the customer and, when the identity of the customer is verified, is configured to, at the customer's option (1) obtain an electronic endorsement from the customer and place the electronic endorsement in an electronic image or (2) print out a hard copy of a check for endorsement by the customer.

BRIEF DESCRIPTION OF THE DRAWINGS

FIGS. 2 to 4 illustrate examples of display screens 24b in the embodiment of FIG. 1.

FIG. 5 illustrates an example of a portion of an electronic display generated by the embodiment of FIG. 1.

DETAILED DESCRIPTION

Figure 1:
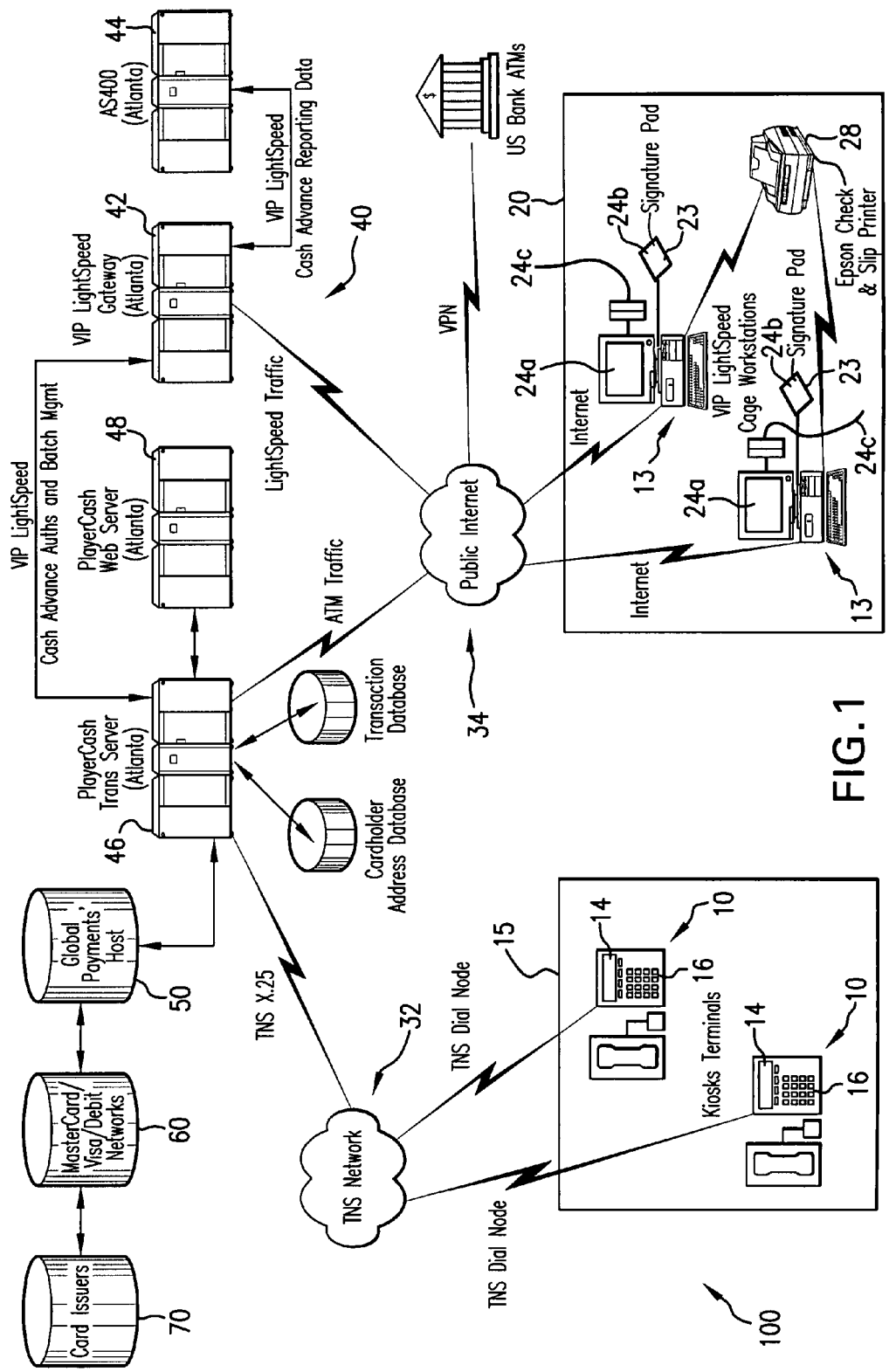
FIG. 1 is an overall arrangement of one embodiment of the invention.

FIG. 1 illustrates one arrangement or system 100 for making funds available for gaming. In this example, the system 100 is owned and administered by a provider of quasi-cash services (as described below), which contracts with gaming establishments to provide such services to the gaming establishments' customers. The system 100 allows a customer to either (1) buy a check payable to himself with a credit or debit card, and then endorse the check over to a casino to obtain funds for gaming or alternatively (2) conduct an electronic transaction which has the same effect. The system 100 has one or more kiosk terminal(s) 10 in a gaming area 15. Each terminal 10 is configured to receive a card from a customer via a card insertion slot and read the customer's information from their card. The card may be, for example, a credit card or a debit card. Each terminal 10 also has a touch screen display 14 and a keypad 16 which serve as an input/output unit to allow the customer to select a "quasi-cash transaction" by either the touch screen or keypad. A quasi-cash transaction is a transaction where the customer is buying an item (e.g., a negotiable instrument) that can directly be converted into cash. The terminal may be a multifunction terminal which also allows the customer to make other types of transactions, such as ATM or cash advance transactions, at the customer's option. The terminal may be portable.

Each terminal 10 is configured such that upon selection of a quasi-cash transaction, the terminal (after obtaining authorization from a card issuer 70 via an applicable card network(s) 60 as described below) generates an order indicating that the quasi-cash transaction has been pre-approved (authorized by a card issuer 70). The order in this embodiment is an electronic order retrievable at a cashier station (described below).

The system 100 also includes a station 20, such as a cashier station or cage. Each station has one or more personal computers 13, each with a display 24a. Each computer is connected to a signature pad 23, which has its own display 24b. Each station 20 also has at least one printer 28 which is capable of printing checks and receipts.

Figure 6:
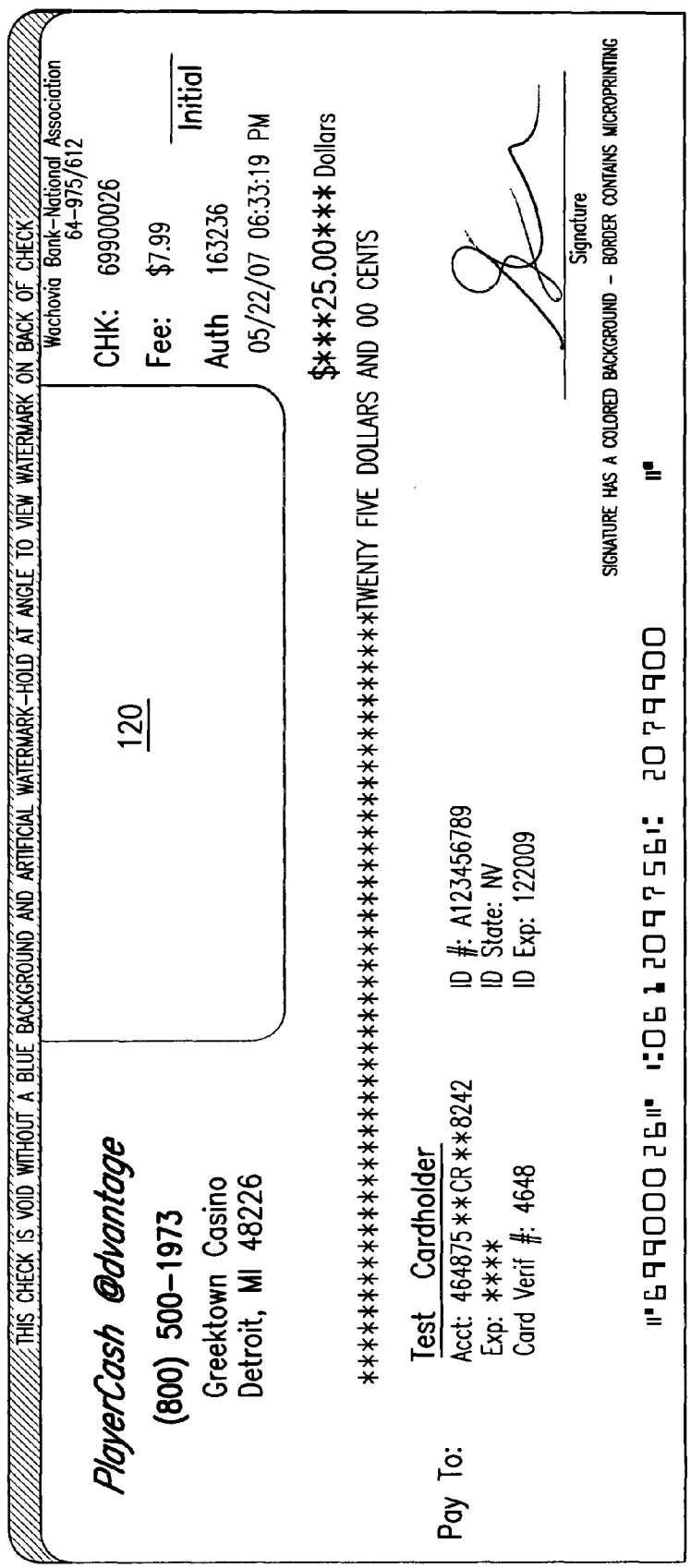
FIG. 6 illustrates an example of a printed check generated by the embodiment of FIG. 1.

Each station 20 is configured to retrieve a customer's pre-approved order from a host system/server(s) via a network (described in further detail below) following a second swipe at a magnetic swipe reader 24c of the same card that was utilized at the terminal 10 for pre-approval. The cashier requests information from the customer to verify the customer's identity such as a driver's license or other acceptable photo identification. The identification is visually inspected, however, it may also be electronically read and the data collected and used to expedite the completion of the transaction. The identity of the customer is then validated by comparing the customer's physical traits to those described on the identification. Each computer 13 is configured such that after the customer's identification is verified, the display 24b asks the customer whether they wish to proceed with the transaction electronically or if they prefer to proceed by processing a paper (hard copy) check. An example of such a display is shown in FIG. 2. (It should be pointed out in connection with FIG. 2 that although FIG. 2 uses the term "cash advance," the transaction being described herein is not a cash advance against one's credit card, as known in common parlance. The transaction is treated by the credit card associations as a special type of purchase transaction and not as a true cash advance, and thus conditions applicable to credit card cash advances (such as separate, generally lower, credit limits and higher interest rates) do not apply.) By having the explicit option to proceed with an electronic transaction or via a paper check, the customer retains control over the transaction's method of completion. If the customer elects not to proceed with an electronic transaction, the customer can cancel the transaction, or elect to proceed with a paper check. If the customer elects to proceed with a paper check, the computer 13 is programmed to instruct printer 28 to print out a hard copy of the check for endorsement by the customer and card imprint by the cashier. (An example of a hard copy check is shown in FIG. 6. In FIG. 6, the imprint would be made in area 120.)

Figure 3:
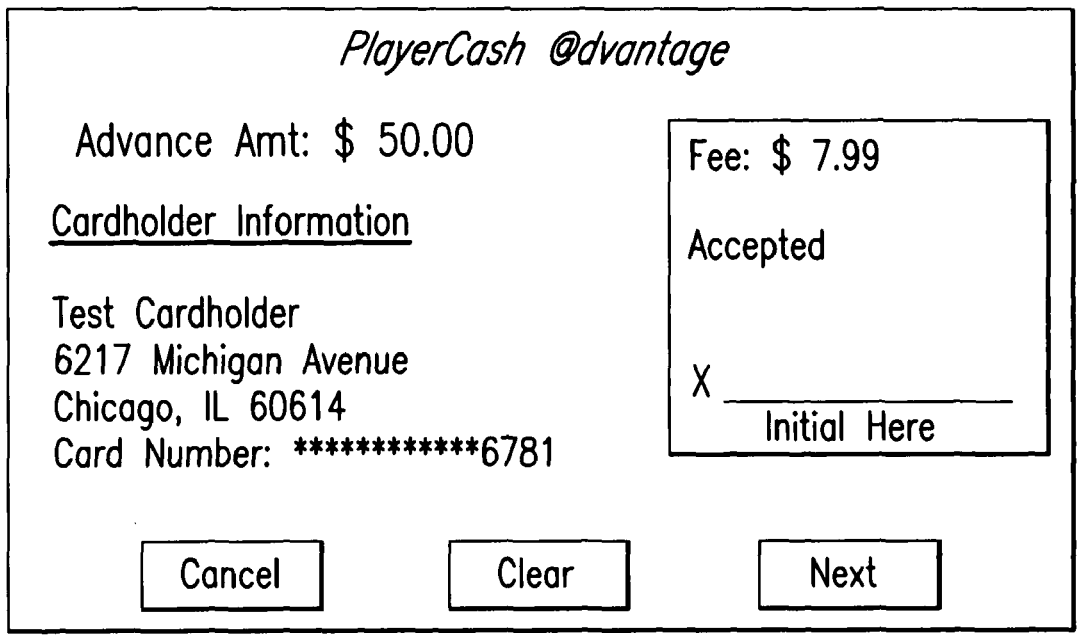

If the computer 13 receives an instruction that the customer wishes to proceed with an electronic transaction, the display 24b asks the customer to confirm the amount of the transaction and also indicate acceptance of a convenience fee by initialing the fee, indicated on the display 24b, with a stylus. An example of such a display is shown in FIG. 3.

Upon receipt of the customer's initials and a "next" instruction, the display 24b once again displays the transaction amount and fee and asks the customer to endorse and accept the electronic transaction for the amounts displayed. An example of a suitable display is shown in FIG. 4.

Figure 7:
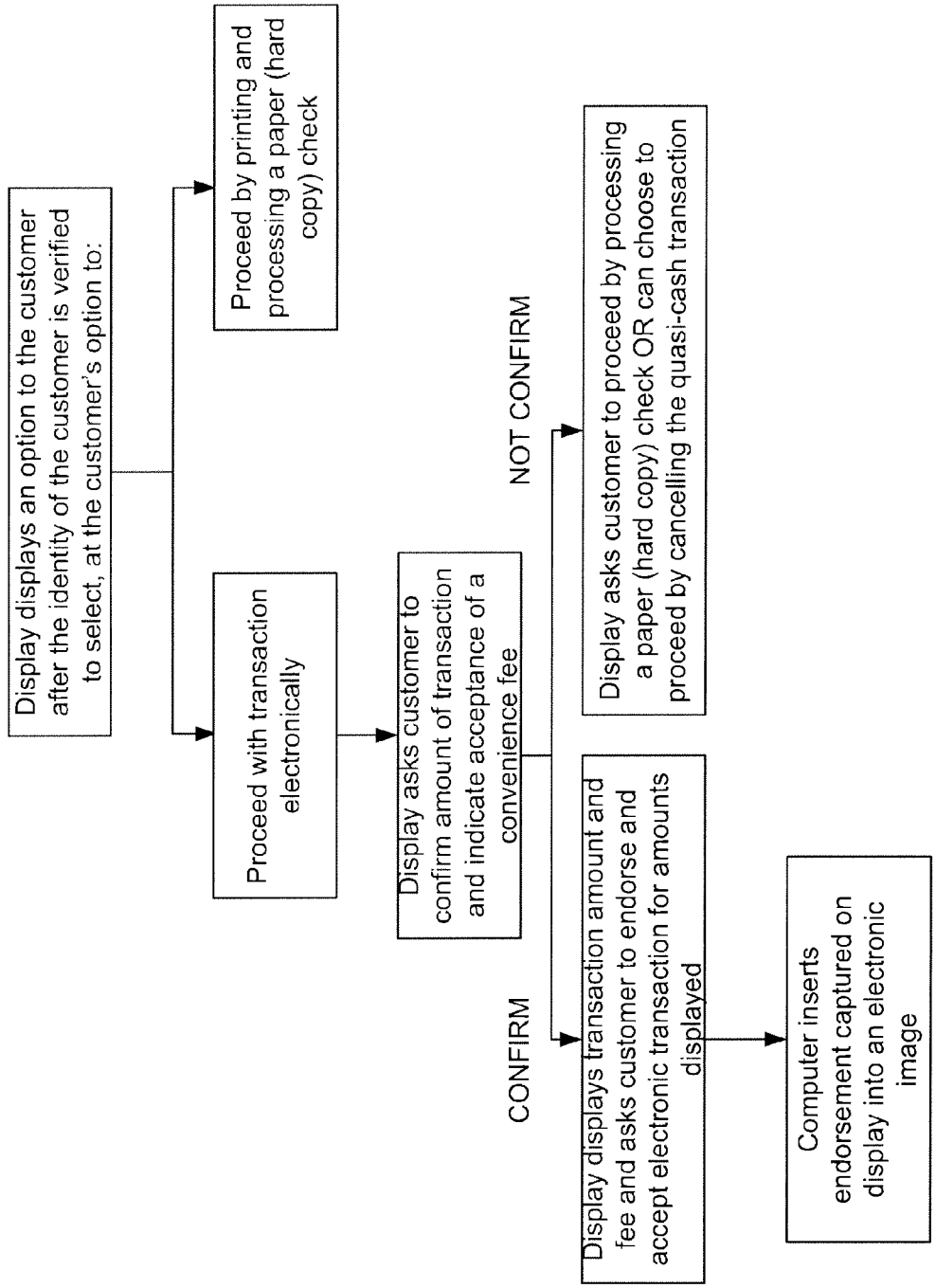
FIG. 7 illustrates an example of what occurs after the indentity of the customer is verified.

When the customer makes the endorsement, the computer 13 inserts the initials and the endorsement captured on display 24b into an image and the computer 13 displays the image containing the initials and endorsement on display 24a. FIG. 5 illustrates an example of an image displayed on display 24a. The display 24a typically shows controls and/or other information in addition to the image of FIG. 5. The cashier uses the image on display 24a to validate the signature to the customer's ID and then the cashier clicks on a "verified" button on the display 24a that creates an image file of the endorsed and initialed document and sends (as will be described below) the file to a repository. As shown in FIG. 5, electronic funds are to be drawn on a bank account of the quasi-cash service provider. In the example of FIG. 5, the bank is Wachovia Bank and the name of the quasi-cash service is PlayerCash@dvantage™. The lower portion of the image contains a check number, a transit routing number, and a bank account number. The image indicates the amount of the transaction, the fee accepted, the identification information (such as driver's license information), authorization information from the card issuer, the name of the cardholder and other card information. The image also includes the name and location of the casino where the transaction takes place. The image is only viewable on the computer display 24a by the casino personnel, who (as described below) verifies that the endorsement matches the signature on the customer's identification. Once verified, while the customer is still standing at the casino station 20, the computer 13 electronically sends the image to permanent storage in a secure offsite image repository, without a trace of sensitive data being stored on the local workstation. The cardholder's data is not captured and stored separately from the transaction data, and the signature is not rejoined to the transaction data at a later date to satisfy retrieval requests, thus ensuring that the customer's data is kept confidential. FIG. 7 illustrates an example of some of the processing described above.

Once the customer has endorsed the electronic image (or the paper check, if the customer has elected to proceed with a paper check), the casino then provides the customer funds for gaming in the form of cash, a marker or other form. A receipt evidencing the transaction is also printed and provided to the customer to keep. The casino obtains reimbursement for the funds advanced to the customer from the quasi-cash service provider via the Automated Clearing House (ACH) network. If the customer elects to use the paper transaction option, after initialing and endorsement by the customer, the casino deposits the endorsed paper check (drawn on the quasi-cash service provider's bank) with its own bank and obtains payment via normal check processing procedures as reimbursement for the funds advanced to the customer. It should be noted that if the customer opts for a paper check, the customer may elect to negotiate the check at another location and/or negotiate the check for other purposes.

The quasi-cash service provider serves as the merchant in the quasi-cash transaction and receives payment from the credit card issuer via the credit card networks (in the case of a credit card transaction) or from the customer's bank account via the debit networks (in the case of a debit card transaction). Such payment reimburses the quasi-cash service provider for its payment to the casino. The amount also includes the fee charged to the customer for the quasi-cash transaction, which the quasi-cash service provider may share with the casino.

The terminals 10 are connected to one or more servers 40 via one or more networks, for example, networks 32 or 34 (FIG. 1 shows terminals 10 being connected only by network 32 however the terminals can be connected by only network 34 or by both networks 32 and 34). One suitable network is a network provided and administered by TNS. Similarly, each station 20 is connected to one or more servers 40 via the internet 34. The FIG. 1 design has four servers 42, 44, 46, and 48 configured and programmed to perform the functions described herein. Server 42 acts as a gateway server and directs transactions from each station 20 to the other servers based on the type of transaction. For example, the type of credit/debit card transactions described herein are directed to server 46 for processing and server 44 for reporting. Other types of transactions are directed to servers 44 and 48 for processing. FIG. 1 is only one example of one suitable arrangement and many modifications and variations are possible. The servers 40 are in turn connected to networks for the credit and debit card companies 60 via a host processor 50. The networks for the credit and debit card companies 60 are in turn connected to networks for the card issuers 70, who initially authorize the transactions.

The transaction described above can also be initiated directly at a station 20, instead of first going to a terminal 10.

The system and method described above allows an individual to buy an item (e.g., a check) that can be directly converted into cash, in a manner similar to buying any other product or service. The system and method has the advantage that the funds received by an individual may (depending on the issuing bank) not count against an individual's daily ATM limit or their cash advance limit. Also certain additional charges/fees/interest (such as a higher interest rate for cash advances) may be avoided. Because an endorsement is obtained in electronic or hard copy form at the customer's option, the system and method complies with wire transfer money order (a subset of quasi-cash) requirements for a signature in accordance with credit/debit card company policies/rules.

The foregoing description of preferred embodiments of the invention have been presented for purposes of illustration and description. It is not intended to be exhaustive or to limit the invention to the precise form disclosed. Modifications and variations will occur to those of skill in the field, and the precise form of the invention must be adapted to the particular application at hand. The scope of the invention is thus defined with reference to the following claims.

What is claimed is:

1. A method for making funds available for gaming, the method comprising:
   reading customer information from a card at a terminal;
   allowing the customer to select a quasi-cash transaction at the terminal and generating an order authorizing the quasi-cash transaction when the customer selects the quasi-cash transaction;
   retrieving the order and information verifying an identity of the customer at a station; and
   displaying an option to the customer when the identity of the customer is verified, on a display included at the station that allows the customer to select, at the customer's option, after the identity of the customer is verified, (1) an electronic endorsement from the customer and placement of the electronic endorsement in an electronic image or (2) a printout of a hard copy of a check for endorsement by the customer,
      wherein the display includes a customer input device and the customer input device asks the customer to select (1) or (2) and receives the customer's selection of (1) or (2) as input,
      wherein if the customer chooses the hard copy, the station is configured to issue an instruction to a printer to print the hard copy, and
      wherein if the customer chooses the electronic endorsement, the display is configured to ask the customer if the transaction is acceptable and to initial the display with a stylus such that after the customer makes the electronic endorsement the station is configured to insert the endorsement on the display into the electronic image, and the station is configured to transfer the electronic image to an image repository.

2. The method as set forth in claim 1, further comprising the step of printing out a receipt by the station.

3. The method as set forth in claim 1, wherein the electronic endorsement is not separated from other portions of the electronic image.

4. A system for making funds available for gaming, the system comprising:
   a terminal which is configured to read customer information from a card, the terminal including an interface unit configured to allow a customer to select a quasi-cash transaction and to generate an order authorizing the quasi-cash transaction;
   a station which is configured to retrieve the order and information verifying an identity of the customer; and
   a display included at the station, the display including a customer input device that is configured to ask the customer to choose at the customer's option, after the identity of the customer is verified, to (1) obtain an electronic endorsement from the customer and place the electronic endorsement in an electronic image or (2) print out a hard copy of a check for endorsement by the customer, and that is configured to receive the customer's selection of (1) or (2) as input,
      wherein if the customer chooses the hard copy, the station is configured to issue an instruction to a printer included at the station to print the hard copy, and
      wherein if the customer chooses the electronic endorsement, the display is configured to ask the customer if the transaction is acceptable and to initial the display with a stylus such that after the customer makes the electronic endorsement the station is configured to insert the endorsement on the display into the electronic image, and the station is configured to transfer the electronic image to a storage unit.

5. The system as set forth in claim 4, wherein the station is configured to obtain electronic initials from the customer.

6. The system as set forth in claim 4, wherein the station is configured to print out a receipt.

7. The system as set forth in claim 4, wherein a hard copy of the electronic image represents a negotiable instrument.

8. The system as set forth in claim 4, wherein the electronic image comprises:
   customer information; and
   the electronic endorsement.

9. A method for making funds available for gaming, the method comprising:
   reading customer information from a card at a terminal included in a gaming area of a casino;
   allowing the customer to select a quasi-cash transaction at the terminal and generating an order authorizing the quasi-cash transaction when the customer selects the quasi-cash transaction;
   retrieving the order and information verifying an identity of the customer at a station included in the gaming area; and
   displaying an option to the customer when the identity of the customer is verified, on a display included at the station that allows the customer to select, at the customer's option, after the identity of the customer is verified, (1) an electronic endorsement from the customer and placement of the electronic endorsement in an electronic image or (2) a printout of a hard copy of a check for endorsement by the customer,
      wherein the display includes a customer input device and the customer input device asks the customer to select (1) or (2) and receives the customer's selection of (1) or (2) as input,
      wherein if the customer chooses the hard copy, the station is configured to issue an instruction to a printer included at the station to print the hard copy, and
      wherein if the customer chooses the electronic endorsement, the display is configured to ask the customer if the transaction is acceptable and to initial the display with a stylus such that after the customer makes the electronic endorsement the station is configured to insert the endorsement on the display into the electronic image, and the station is configured to transfer the electronic image to an image repository.

10. A system for making funds available for gaming, the system comprising:
   a terminal included in a gaming area of a casino which is configured to read customer information from a card, the terminal including an interface unit configured to allow a customer to select a quasi-cash transaction and to generate an order authorizing the quasi-cash transaction;
   a station included in the gaming area which is configured to retrieve the order and information verifying an identity of the customer; and
   a display included at the station, the display including a customer input device that is configured to ask the customer to choose at the customer's option, after the identity of the customer is verified, to (1) obtain an electronic endorsement from the customer and place the electronic endorsement in an electronic image or (2) print out a hard copy of a check for endorsement by the customer, and that is configured to receive the customer's selection of (1) or (2) as input, wherein if the customer chooses the hard copy, the station is configured to issue an instruction to a printer included at the station to print the hard copy, and
wherein if the customer chooses the electronic endorsement, the display is configured to ask the customer if the transaction is acceptable and to initial the display with a stylus such that after the customer makes the electronic endorsement the station is configured to insert the endorsement on the display into the electronic image, and the station is configured to transfer the electronic image to a storage unit.

* * * * *